United States Patent [19]

Wolfram

[11] Patent Number: 4,545,306
[45] Date of Patent: Oct. 8, 1985

[54] HIGH TEMPERATURE FURNACE

[75] Inventor: Norman E. Wolfram, Turners Falls, Mass.

[73] Assignee: Northeast Pyreduction Corp., Woburn, Mass.

[21] Appl. No.: 539,683

[22] Filed: Oct. 6, 1983

[51] Int. Cl.[4] .............................................. F23G 5/00
[52] U.S. Cl. .................................... 110/247; 110/171; 110/244; 110/254; 110/259; 110/277; 110/300; 431/173
[58] Field of Search ................... 110/165 R, 171, 210, 110/214, 235, 244, 247, 254, 256, 259, 264, 266, 277, 286, 287, 288, 298, 300, 346, 348; 431/173, 176, 178, 198, 201

[56] References Cited

U.S. PATENT DOCUMENTS

| | | | |
|---|---|---|---|
| 1,724,352 | 8/1929 | Ilving | 110/247 |
| 2,023,577 | 12/1935 | Corbett | 110/277 |
| 3,332,853 | 7/1967 | Urquhart | 110/264 |
| 3,404,643 | 10/1968 | Ankerson | 110/247 |
| 3,741,136 | 6/1973 | Stookey | 110/171 |
| 3,744,438 | 7/1973 | Southwick | 110/259 |
| 4,388,876 | 6/1983 | Burton | 110/247 |

Primary Examiner—Albert J. Makay
Assistant Examiner—Steven E. Warner
Attorney, Agent, or Firm—Chapin, Neal & Dempsey

[57] ABSTRACT

An improved high temperature furnace is disclosed for consuming various fuels and organic waste materials while generating usable energy. The furnace has a high pressure aeration system in its combustion chamber to increase combustion efficiency. One set of obliquely oriented nozzles disposed at the periphery of the combustion chamber injects high velocity, heated air into the furnace and an opposed set of nozzles also injects high velocity, heated air tangentially from the adjacent center of the chamber. Heated, high velocity air from all the air nozzles is directed generally in the same tangential direction creating a swirling action or turbulence which accelerates the break up of the waste to increase the completeness of the combustion and retains the fuel in suspension within the furnace until combustion is essentially completed. The centrifugal force created by this swirling action impels the hot ash toward the outer chamber wall to minimize its upward escape through the incinerator flue. The high efficiency burning process resulting from high temperatures, turbulence and extended fuel retention time and provides for a comparatively small, low cost and transportable furnace.

4 Claims, 3 Drawing Figures

HIGH TEMPERATURE FURNACE

BACKGROUND OF THE INVENTION

The present invention relates to improved burners or furnaces adapted to operate at very high temperature in the range of 2,500°–3,500° F. whereby organic solid and liquid waste matter, as well as various solid or liquid fuels, including coal and liquid petroleum, especially high viscosity oils and waste oil are consumed to generate usable heat. Worthwhile benefits are obtainable by providing furnaces which are capable of both efficient waste disposal and conservation of energy resources by utilizing waste matter as the primary or only fuel source.

One of the greatest concerns of modern society is the disposal of mountainous quantities of waste matter, much of which has valuable and substantial energy content, in a safe and efficiency manner with minimum deleterious effect on the environment. Many communities and private industries have resorted to the use of large incinerators to dispose of both solid and liquid organic waste matter, including for example: garbage, trash, plastics, waste tires, railroad ties, and used oil, tar or pitch. While available incinerators are generally useful in such waste disposal, supplementary fuel is needed to support effective combustion. In addition, large quantities of ash and other residues, due to incomplete combustion, must be quenched and disposed of in land fills resulting in the need to treat process water. Moreover, certain types of waste, such as scrap tires, cannot be efficiently burned in such installations and must be disposed of by other means that are not available to most communities.

Another disadvantage encountered in the use of available waste furnaces is the escape of hot ash residues through the chimney of the incinerator. Such ash residues may cause fires in the vicinity of the furnace, cause noxious odors and tend to deteriorate the walls of the chimney and/or scrubbing system; and, when combined with water, acids are formed which create other forms of air and water pollution.

The Wolfram U.S. Pat. No. 2,874,655 which discloses a "Method and Application for Removal of Tree Stumps", recognizes the advantages of directing heated compressed air directly onto a burning stump. The Nakano U.S. Pat. No. 3,671,167 discloses an "Incinerator For Waste Oil" with means for supplying air through rotating arms and secondary combustion air through and normal to the side walls thereof. While these patents relate to high temperature burners, they fail to disclose burners in which nozzles for supplying high pressure air extend tangentially from both outer and inner walls of the combustion chamber to create cyclonic high temperature, high velocity air flow for virtually complete combustion within the combustion chamber and the capability of burning virtually any solid or liquid fuel.

Accordingly, it is a principal object of the present invention to provide an improved furnace construction which by means of very high combustion temperatures, cyclonic air turbulence and fuel particle retention enables virtually complete combustion of most types of waste matter in a faster and more efficient manner than in furnaces heretofore available.

It is another object to provide a furnace of the above type wherein combustion air is so controlled as to prevent escape of hot ash and unburned fuel particles from the combustion chamber of the furnace.

It is yet another object to provide a furnace of the above type that eliminates or significantly reduces related polution problems, including particulate emissions, toxic gas emission, noxious odors, disposal of solid waste and process water effluents.

It is a further object to provide a furnace of the above type which, because of its high operating temperatures, may be employed to produce high quality steam with high heat to moisture ratio needed to power a turbo generator efficiently.

It is still a further object to provide a furnace of the above type which in comparison to existing furnaces, may be made more compact, thus being transportable if necessary, is relatively inexpensive, suitable for high energy recovery and adaptable for community and industrial use ranging from very small to large multi-unit installations.

Another object is to reduce ash to slag for disposal as an inert low volume solid that can be safely disposed of in the form of landfill.

The above and other objects of this invention will become more readily apparent from the following description read in conjunction with the accompanying drawings in which.

Figure 3:
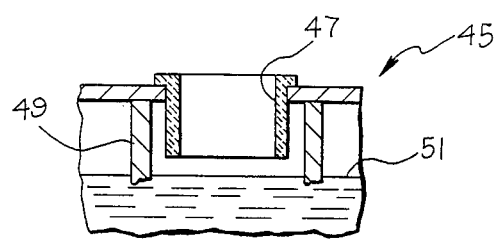

FIG. 3 cross-sectional view of a modified slag removal system for the furnace.

Figure 1:
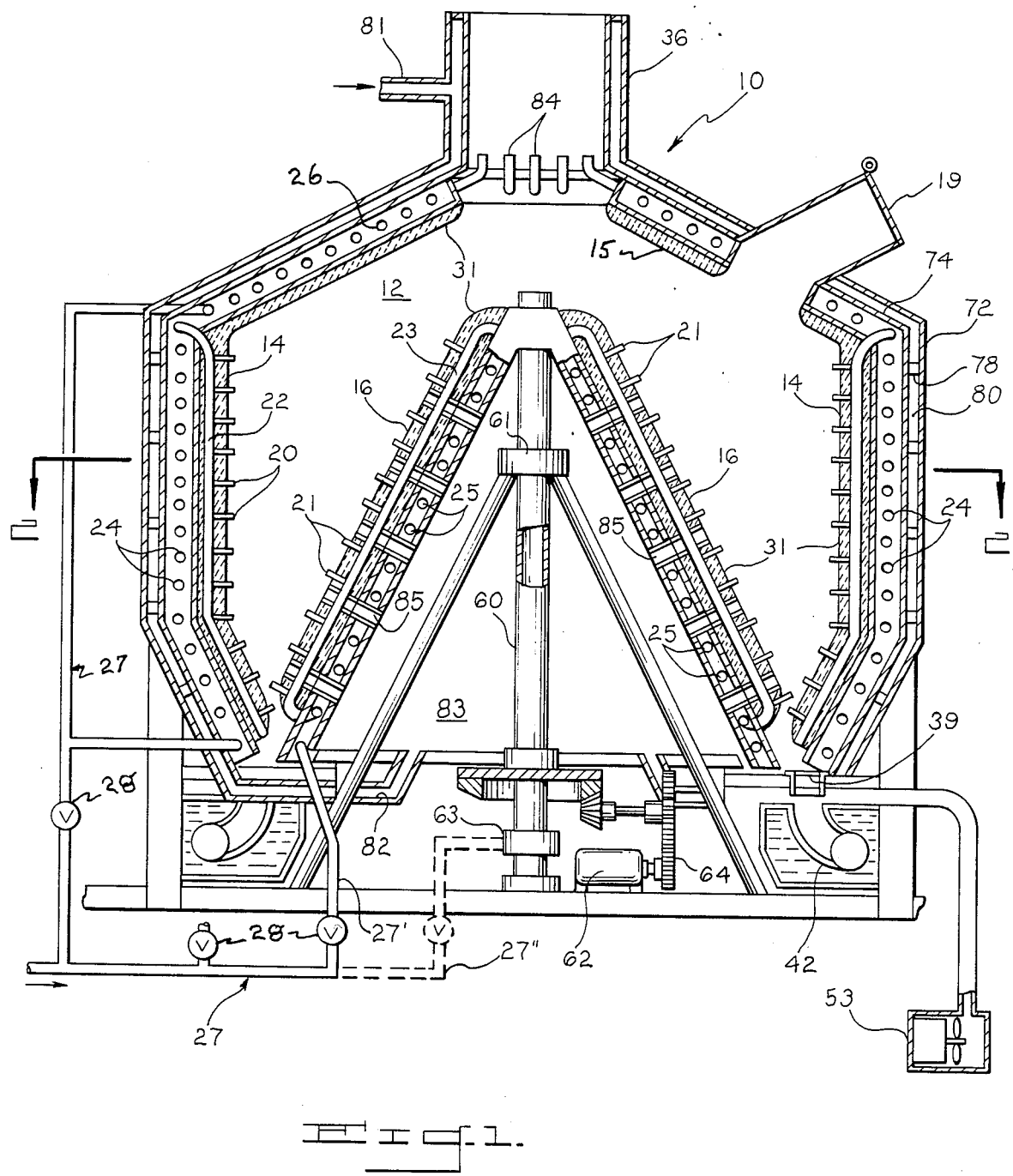
FIG. 1 is an elevational, cross-sectional view of a furnace constructed in accordance with the present invention.

Referring in detail to the drawings and particularly to FIG. 1, a furnace for various fuels and organic matter is shown generally at 10. The furnace includes a cylindrical or annular combustion chamber 12 having a peripheral wall 14, an upper wall 15, and a central inner wall or hearth 16 of conical configuration upon which fuel and/or waste matter is deposited for burning. The side wall 14 of the burner is generally cylindrical and the top wall 15 is of conical configuration of substantially lesser slope than the inner wall 16. Materials to be burned are introduced into the combustion chamber through an air lock feed chute 19 which may be fed by a conveyor or hopper, not shown.

Figure 2:
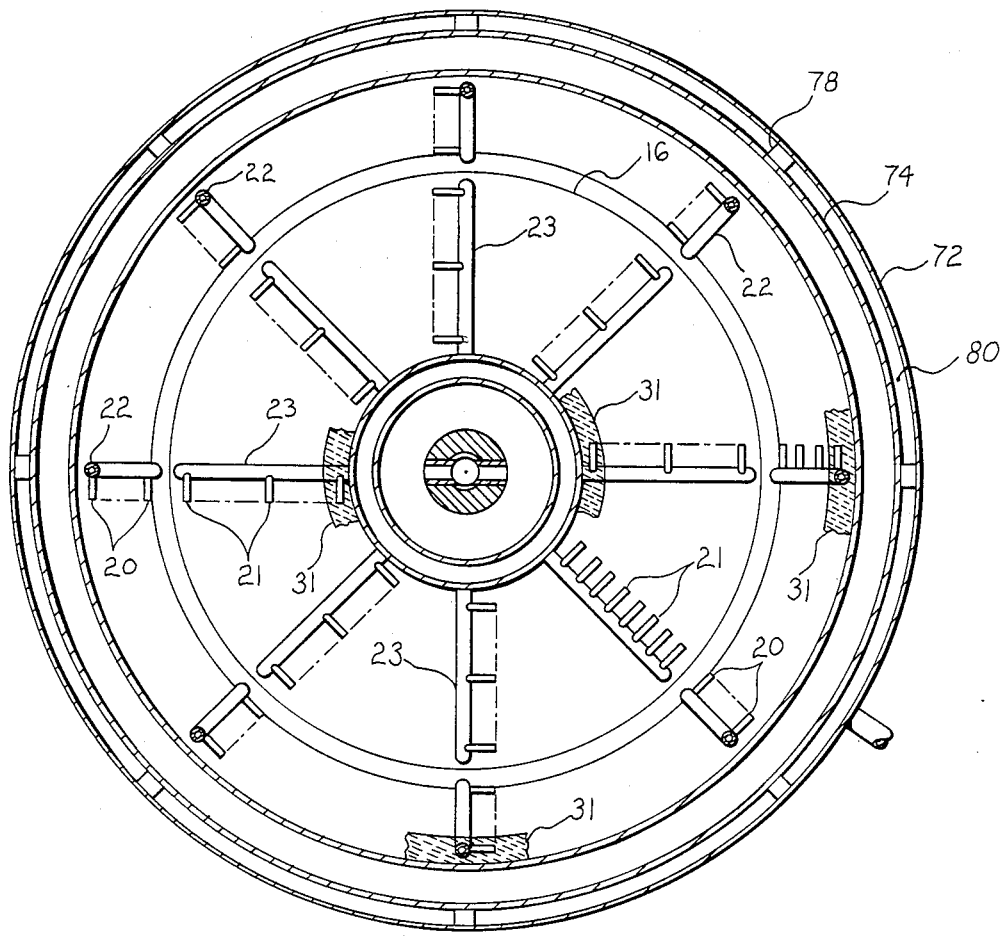
FIG. 2 is a cross-sectional view taken along line 2-2 of FIG. 1.

The furnace includes a plurality of inwardly and outwardly directed sets of nozzles 20 and 21 respectively. As best shown in FIG. 2, the nozzles 20 extend in vertically spaced relation from a plurality of upright pipes 22 circumferentially spaced uniformly about the outer wall 14 or periphery of the chamber 12. The outwardly directed nozzles 21 also extend in vertically spaced relation from a plurality of upwardly extending, circumferentially spaced pipes 23 embedded in the conical inner wall 16 generally at the center of the combustion chamber. The nozzles 20 and 21 are all directed approximately tangentially to the adjacent wall of the furnace and the air supply pipes 22 and 23 are connected at their upper ends to tubular helical coils 24 and 25 embedded respectively in the outer and inner walls of the furnace to receive high pressure, heated air from these coils. As shown, the inner walls of the furnace and hearth are coated with a fire resistant material 31.

Compressed air or air combined with oxygen is supplied to the lower end of the coils 24 and 25 by air supply pipes 27 having a control valve 28 in each branch thereof so that the flow of compressed air through the tubular coils 24 and 25 may be controlled for efficient combustion. The air supply system includes two alternate supply branches 27' and 27", depending upon whether or not the hearth 16 is rotatable, as will hereinafter be discussed. The heated air from the coils then enters the pipes 22 and 23 and flows through the nozzles 20 and 21 by which the heated, high velocity air is injected into the combustion chamber 12. As best illustrated in FIG. 2, all the nozzles 20 and 21 are directed at an oblique angle or generally tangentially to the adjacent wall of the furnace. Since all the nozzles point in generally the same circular direction, a high velocity circular or cyclonic air flow is generated, which in the illustrated embodiment of FIG. 2, would be in a counterclockwise direction. Unburned fuel particles are thereby suspended and scoured by the air circulating within the chamber 12.

A portion of the heat generated by the fuel and/or burning waste material in chamber 12 heats the furnace walls and is absorbed by the high velocity air flowing in coils 24 and 25 which are embedded in the furnace walls. A portion of the energy derived from the combustion process is thus recovered and returned by the nozzles 20 and 21 into the combustion chamber 12 in the form of heat and velocity which has been picked up by the air, thereby causing a greatly increased rate of combustion. The air supply nozzles not only provide for an increase in the oxygen supply to the burning mass, but also cause particle suspension and turbulence with resultant rapid and efficient combustion. Preferably, the temperature of the air at the nozzles will be over 900° F. and have a velocity of over 175 cu. ft./second. The velocity of the air, provided by the inner and outer nozzles 20 and 21, imparts circular movement to the particulate matter within the furnace chamber so that the particles will remain in air suspension even when moving adjacent the inner and outer walls of the combustion chamber. Because of the complete combustion achieved with this type of furnace construction, a heat exchange apparatus adapted to receive the flue gases will not be fouled by unburned particulate residue of the combustion process.

The furnace is constructed with a jacketed outer wall to provide a supplementary source of heated air. The jacket 80 is defined between outer wall 72 and inner wall 74 which are spaced apart by radial or transverse spacer blocks or bars 78. A source of air is supplied to the furnace jacket by a conduit 81 connected to flue 36 and to a compressed air supply. At its lower end, the jacket 80 is connected by conduit 82 to the bottom of a chamber 83 disposed within the conical central wall of the combustion chamber. A plurality of openings or air passages 85 extend through the conical inner wall 16 of the furnace so that compressed air received from air supply pipe 81 will be circulated through the furnace jacket 80 and pick up heat from the inner furnace wall 74. The heated, jacket air will then be forced under pressure into chamber 83 from which it will be supplied to the combustion chamber 12 by a plurality of ports or passages 85. By this constructional arrangement, additional heated air is injected into the combustion chamber 12 to further aid in the combustion process by providing more air and increased turbulence within the combustion chamber.

The furnace also includes a waste removal system to remove any ash or slag which results from the combustion process. As shown in FIG. 1, a grating 39 is located across the opening formed in the bottom of the combustion chamber and a plurality of pipes, one of which is shown at 42, serves to conduct the waste material from the chamber. At higher operating temperatures which generally result in the formation of molten slag, the waste removal system would be modified to one such as shown at 45 in FIG. 3. In this construction, the grating is omitted and the drain 45 includes an inner tubular member 47 composed of a high temperature refractory material. An outer tubular casing or jacket 49 is disposed coaxially about the tube 47, and the lower end of the outer casing terminates in a water seal illustrated at 51. By this arrangement, the molten slag flows into the water 51 while any air flow, such as generated by air supply fan 53, is prevented from flowing out of the furnace through the slag removal drains.

While not essential for all applications, I have provided means by which the inner conical wall or hearth may be rotated about its vertical axis. The drive means comprises a shaft 60 journaled by bearings 61 and 63 and driven by drive motor 62 coupled to the shaft by suitable reduction gearing 64, which causes the shaft to rotate at a suitable rpm for optimum results. In the rotatable embodiment, high pressure air would be supplied to the upper end of helical coil 25 by pipe 27" connected by the lower bearing 63 which is adapted to supply air into the tubular shaft 60 from which it is supplied to coil 25. In this type of installation, pipe 27' would be omitted or disconnected from the rotatable hearth. The rotatable hearth may be preferable for use in furnace installations adapted to burn unshredded waste composed of large chunks of materials, such as old tire casings and the like. As the hearth rotates, the nozzles 21 carried thereby will move through the burning waste or fuel and evenly stoke the material to increase its surface area and thereby enhance its rate of combustion. For normal operations using various types of solid or liquid fuels and shredded or comminuted solid waste, the use of a rotary hearth has been found unnecessary and need not be employed. In such cases, the high velocity, heated air injected into the furnace chamber from the inner and outer walls will normally provide sufficient turbulence for complete and efficient combustion. Although not shown in the illustrated embodiment, my furnace may also be provided with a rotatable stoker arm in lieu of the rotary hearth. The arm would rotate in spaced relation to the inner wall 16 and include a plurality of spaced air supply nozzles.

The combustion chamber may also include "over fire" nozzles 84 mounted adjacent the lower end of the flue 36 and directed inwardly and upwardly. These nozzles are connected to receive heated, high velocity air from the upper end of a tubular coil 26 embedded in the upper chamber wall 15. These nozzles are used in conjunction with a sensor and air control valve 28 which cause heated air to be supplied to the nozzles 84 when excessive ash or smoke is detected passing through the flue. When such smoke is detected by the sensor, the control valve 28 feeds air to the nozzles 84 and these air streams initiate more complete combustion in the flue gases and result in dissipating excessive ash and smoke discharge. In addition, this sensor can be connected to control other air supply valves 28 for controlling the flow rate of air through the supply pipes 27 so that the resultant air flow from the nozzles 20 and 21 can be increased when dense smoke occurs or decreased as appropriate. The result is that the waste will be more completely consumed and the undesirable smoke is essentially eliminated by simply controlling the furnace air supply and the chamber walls can be maintained within predetermined safe temperature limits.

It will be appreciated that for burning certain types of materials which inherently produce combustion gases harmful to the environment, certain additives may be introduced into the furnace. For example: when burning polychlorinated biphenols (PCB's) the addition of sodium chloride will produce a harmless slag and when burning high sulphur coal, calcium carbonate may be used.

It will be understood by those skilled in the art that obvious structural modifications can be made without departing from the spirit of the invention. Accordingly, reference should be made primarily to the accompanying claims, rather than to the foregoing detailed description of the preferred embodiments, to determine the scope of the invention.

Having thus described the invention, what is claimed is:

1. A furance for burning fuel and/or organic waste material having a combustion chamber defined by an upwardly extending, conical base member and an outer wall surrounding said base and having a flue therethrough for exhausting combustion gases from said chamber, the improvement comprising a plurality of nozzles extending in opposite directions into said chamber from both said outer wall and base member and then tangentially in generally the same direction relative to said wall and base member, and means for supplying high velocity, heated air to said nozzles to provide unidirectional high velocity, circular air flow within said chamber so that waste or unburned fuel within said chamber is suspended and retained within the chamber until combustion is completed, the air supply means including air conduit embedded within the walls defining said chamber, whereby a portion of the energy generated by combustion within the chamber and absorbed by the chamber walls is transferred to the air flowing in said conduit to increase its temperature prior to its burning injected by said nozzles into the chamber and resulting in increased air volume at high velocity and valve means controlling the air flow within said conduit for maintaining the chamber walls within a predetermined temperature range, said furnace having an outer jacket wall construction adapted for the flow of air therein, an interior chamber disposed within said conical base and means for conducting air from the jacket to said interior chamber whereby air heated in the furnace jacket is supplied to said interior chamber, said conical base including a plurality of air passages therethrough whereby the jacket-heated air is supplied to the central portion of said combustion chamber.

2. A furnace for burning fuel and/or organic waste material having a combustion chamber defined by a central hearth, an outer wall surrounding said hearth and an upper wall having a flue therethrough for exhausting combustion gases from said chamber, the improvement comprising said hearth being of generally conical configuration with its apex disposed upwardly toward said flue, said outer wall and hearth each having a plurality of nozzles tangentially directed to inject heated, high velocity air into said chamber, means supplying compressed air to said nozzles and means for controlling the flow rate of air to said nozzles, said air supplying means including at least one helical, tubular coil disposed within the walls of said chamber whereby the air flowing within said coil is heated before it is injected into said chamber to maintain said walls within predetermined temperature limits and to enable said furnace to operate at very high temperatures.

3. A furnace as set forth in claim 2, in which at least one air-carrying coil is embedded in a wall portion of the surface, and nozzles are disposed adjacent the base of said flue and are connected to receive heated air from said coil to provide an after burner to cause more complete combustion of any combustible materials escaping from the combustion chamber.

4. A furnace as set forth in claim 3 in which said combustion chamber includes heat resistant drains for slag removal, said drains having a water seal to maintain pressure within the furnace at a predetermined level to quench the slag for removal and to maintain said drain within a predetermined temperature range to prevent excessive air cooling of the drain by ambient air being introduced into the combustion chamber of the furnace.

* * * * *